United States Patent
Hoffmann et al.

(10) Patent No.: US 9,632,970 B2
(45) Date of Patent: Apr. 25, 2017

(54) DEVICE, METHOD AND COMPUTER PROGRAM FOR OPERATING A DATA BUS SYSTEM OF A MOTOR VEHICLE

(71) Applicant: VOLKSWAGEN AG, Wolfsburg (DE)

(72) Inventors: Christoph Hoffmann, Wolfsburg (DE); Mirko Vujasinovic, Wolfsburg (DE)

(73) Assignee: Volkswagen AG, Wolfsburg (DE)

(*) Notice: Subject to any disclaimer, the term of this patent is extended or adjusted under 35 U.S.C. 154(b) by 336 days.

(21) Appl. No.: 14/391,430

(22) PCT Filed: Apr. 11, 2013

(86) PCT No.: PCT/EP2013/057571
§ 371 (c)(1),
(2) Date: Oct. 9, 2014

(87) PCT Pub. No.: WO2013/153151
PCT Pub. Date: Oct. 17, 2013

(65) Prior Publication Data
US 2015/0106540 A1 Apr. 16, 2015

(30) Foreign Application Priority Data

Apr. 14, 2012 (DE) .................. 10 2012 007 545
Jul. 25, 2012 (DE) .................. 10 2012 014 724

(51) Int. Cl.
*G06F 13/42* (2006.01)
*B60L 11/18* (2006.01)
*H04L 12/40* (2006.01)

(52) U.S. Cl.
CPC ...... *G06F 13/4221* (2013.01); *B60L 11/1846* (2013.01); *B60L 11/1861* (2013.01);
(Continued)

(58) Field of Classification Search
CPC ................................ H04L 12/40039
See application file for complete search history.

(56) References Cited

U.S. PATENT DOCUMENTS 6,484,082 B1* 11/2002 Millsap ............... H04L 12/4035
701/32.7
2008/0300732 A1* 12/2008 Luz .................... H04L 12/12
701/1
2011/0046844 A1 2/2011 Honner et al.

FOREIGN PATENT DOCUMENTS

DE 19947407 A1 5/2001
DE 10210664 C1 8/2003
(Continued)

OTHER PUBLICATIONS

Search Report for International Patent Application No. PCT/EP2013/057571; Aug. 6, 2013.

*Primary Examiner* — Idriss N Alrobaye
*Assistant Examiner* — Ronald Modo
(74) *Attorney, Agent, or Firm* — Barnes & Thornburg LLP

(57) ABSTRACT

An apparatus for operating a data bus system of a motor vehicle having data bus segments, at least one of the data bus segments is designed to switch from an active state to a rest state and vice versa. In a first step, a communication requirement is detected of a first control device of a first data bus segment in the rest state. If a communication requirement of the first control device is detected, the first data bus segment is brought from the rest state into the active state. If a communication requirement of the first control device with a second control device outside of the first data bus segment is detected, all other data bus segments of the data bus system outside of the first data bus segment that are in the rest state are additionally activated across the board.

12 Claims, 4 Drawing Sheets

(52) U.S. Cl.
CPC .......... *H04L 12/40039* (2013.01); *H04L 2012/40215* (2013.01); *H04L 2012/40273* (2013.01); *Y02B 60/1228* (2013.01); *Y02B 60/1235* (2013.01); *Y02B 60/32* (2013.01); *Y02T 10/7005* (2013.01); *Y02T 10/705* (2013.01); *Y02T 10/7044* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

FOREIGN PATENT DOCUMENTS

| | | |
|---|---:|---|
| DE | 60126373 T2 | 11/2007 |
| DE | 102006023274 A1 | 11/2007 |
| DE | 102006040442 A1 | 3/2008 |
| DE | 102009029541 A1 | 3/2011 |
| EP | 0773650 A2 | 5/1997 |
| EP | 0870648 A2 | 10/1998 |
| EP | 1158718 A2 | 11/2001 |
| EP | 2151737 A1 | 2/2010 |
| EP | 2408141 A1 | 1/2012 |
| WO | 0030898 A1 | 6/2000 |

\* cited by examiner

DEVICE, METHOD AND COMPUTER PROGRAM FOR OPERATING A DATA BUS SYSTEM OF A MOTOR VEHICLE

PRIORITY CLAIM

This patent application is a U.S. National Phase of International Patent Application No. PCT/EP2013/057571, filed 11 Apr. 2013, which claims priority to German Patent Application Nos. 10 2012 007 545.6, filed 14 Apr. 2012, and 10 2012 014 724.4, filed 25 Jul. 2012, the disclosures of which are incorporated herein by reference in their entirety.

SUMMARY

Exemplary embodiments relate to bus systems and to apparatuses, methods and computer programs for operating data bus systems in motor vehicles.

Disclosed embodiments provide a concept for operating a data bus system of a motor vehicle, which concept allows power-saving operation and at the same time is simple to implement.

BRIEF DESCRIPTION OF THE DRAWINGS

Exemplary embodiments of the present invention will be explained in greater detail below with reference to the appended figures, in which.

DETAILED DESCRIPTION OF THE DISCLOSED EMBODIMENTS

Figure 1:
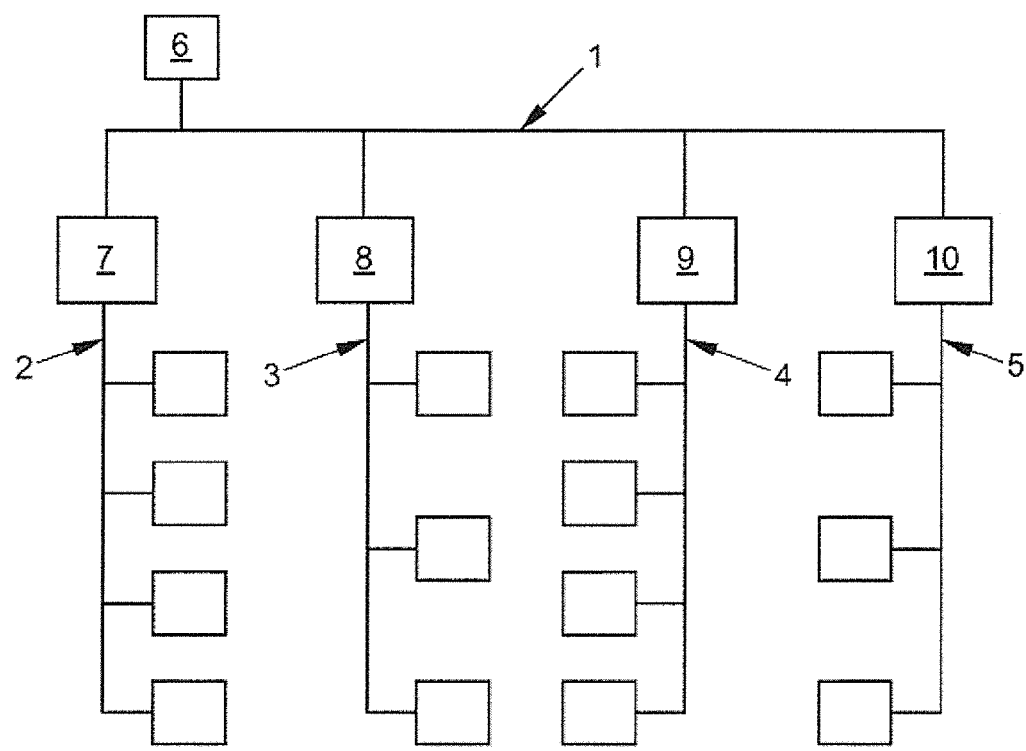
FIG. 1 shows a block diagram of a data bus system for motor vehicles.

Disclosed embodiments provide an apparatus for operating a data bus system of a motor vehicle, wherein the data bus system has a plurality of separate data bus segments or data bus subsystems. According to exemplary embodiments, the data bus segments or data bus subsystems are at least three different data bus segments which differ, for example, by virtue of different data rates and which are coupled to one another, for example, by means of one or more gateways. The data bus system may be, for example, a field bus system, in particular a field bus system with data bus segments from the group comprising CAN bus, FlexRay bus, MOST bus and/or LIN bus.

In this case, a plurality of the data bus segments are designed to change from an awake state to an idle state and vice versa. In this case, an idle state of a data bus segment can be defined by one or more (for example all) controllers of the data bus segment being in an idle state with current consumption or electrical power consumption which is reduced in comparison to an awake state. All of the data bus segments may be moved from the idle/sleep state to the awake state, and vice versa, that is to say each have a so-called sleep mode (idle state) and an active mode (awake state).

According to exemplary embodiments, the apparatus for operating the data bus system comprises a device for determining a communication requirement of a first controller of a first data bus segment in the idle state. In this case, all data bus segments of the vehicle can, for example, be in the idle state, for example during an idle state of the vehicle. The apparatus further comprises a device for waking up the first data bus segment from the idle state to the awake state when a communication requirement of the first controller is determined. In this case, the wake-up device is furthermore designed to additionally wake up all further data bus segments, which are in the idle state, of the data bus system outside the first data bus segment from the idle state at the same time when a communication requirement of the first controller with a second controller outside the first data bus segment is determined. There may be a communication requirement, for example, in the event of a wake event. In this case, wake events are input-end signal changes to controller interfaces which lead to local wake-up of the controller and can propagate onto the connected bus segment via a notice interface. Therefore, a distinction can be drawn between local (controller-internal) and bus segment-related (controller-external) wake events.

This ability to be woken is necessary in some functions of modern motor vehicles to allow communication between different controllers, for example, even when the motor vehicle is idle. Wake events can lead to a local power-up of a controller by virtue of a signal at an interruptible input. In exemplary embodiments, wake propagation onto the connected data bus segment and possibly, in a second step, to all further data bus segments of the data bus system takes place depending on the signal relevance for the rest of the systems. If a data bus segment is woken, the controllers which are connected to the data bus segment power up and allow data communication. If no controller requires bus operation, the bus can idle again and the previously powered-up controllers return to the sleep state.

Although a data bus segment is in the idle state when all controllers of the data bus segment are in an idle state in some exemplary embodiments, the concept can, however, also be implemented when only some of the controllers of the data bus segment change to an idle state, for example because some controllers do not have the capability to change to an idle state. The idle state of a controller can be different. It is possible for the controller to be in an idle state in respect of its communication interface, that is to say for the controller to no longer communicate by means of a data bus. The controller itself can assume different states irrespective of its outwardly visible idle state. It can, for example, be completely awake or completely deactivated or in an idle state in which there is only a limited functionality.

Therefore, some exemplary embodiments allow only those data bus segments which are required for data communication between the first and the second controller to be woken up, this in turn allowing operation which saves an enormous amount of current. If, for example, the two controllers are part of one and the same data bus segment, only this data bus segment, or the controllers present in the data bus segment, is/are woken up. In most cases, this already allows data communication between controllers (microcontrollers) since, in most cases, only controllers of a single data bus segment communicate with one another. The wake-up device can therefore be designed to wake all controllers, which are in the idle state, of the first data bus segment for example in response to a wake signal, which is initiated by the first controller, when a communication requirement is determined only within the first data bus segment, to be able to then interchange data with the desired communication partner within the first data bus segment.

All further data bus segments, which are in the idle state, are additionally woken outside the first data bus segment only when the communication requirement is directed at a controller of another data bus segment which is separate from the first segment. Therefore, if the communication partner of the first controller, that is to say the second controller, is situated outside the first data bus segment in a different second data bus segment, the second data bus segment is as a result also activated, that is to say moved to the awake state, in addition to the first data bus segment.

This is advantageous particularly when the first data bus segment is a diagnosis bus segment, such as a diagnosis CAN with a (vehicle) diagnosis controller for example. Therefore, in a manner prompted by the controller of the diagnosis CAN, all separate data bus segments of the motor vehicle data bus system can be woken up for diagnosis purposes. To this end, it is possible, for example, for a diagnosis command to be sent by means of the data bus 1, the diagnosis command containing, as information, at least one identifier or an identification of the at least one second data bus segment which is to be woken up. The second data bus segment which is woken in this way, such as a drive CAN, a chassis CAN, a convenience CAN, and/or an infotainment CAN for example, can therefore be activated for a limited time or else permanently. If all data bus segments are woken, a plurality of identifiers/identifications or a corresponding combination identifier can also be sent. In other words, the first data bus segment can therefore be a diagnosis bus segment, wherein the wake-up device can then be designed to additionally wake up at least the second data bus segment on the basis of a diagnosis signal, which identifies the second data bus segment which is to be woken up, when a communication requirement of the diagnosis bus segment with the at least one second data bus segment is determined.

The wake method is, therefore, a two-stage wake method in which, in addition to the first data bus segment, all further data bus segments of the data bus system may be woken when there is a communication requirement. This feature serves for further simplification since neither the first controller nor a gateway which is involved in data interchange has to know which other (second) data bus segment has to be woken in addition to the first to satisfy the communication requirement. In the two-stage wake method, the second data bus segment can therefore also be woken in such a way that, after the first data bus segment is woken up, all further data bus segments of the data bus system are woken up, that is to say activated, in one go as the second stage of the wake method. This has the advantage that complicated and costly addressing and/or identification of the desired communication partner of the first controller is not necessary. Addressing of this kind is also often rarely possible since the first controller or the first data bus segment has no knowledge about an association of the individual controllers with the various data bus segments. While a controller (for example ABS controller) can be associated with a data bus segment A (for example chassis CAN) in one type of vehicle, the controller can be associated with another data bus segment B (for example drive CAN) in another type of vehicle. According to exemplary embodiments of this kind, the wake-up device can therefore be designed to additionally wake up all further data bus segments, which are in the idle state, of the data bus system in one go when a communication requirement of the first controller with a second controller outside the first data bus segment is determined, so that all data bus segments of the data bus system are in the awake state. When there are at least three different data bus segments, after a first data bus segment, the other at least two data bus segments are therefore also woken up in the second step. In this way, it does not matter which data bus segment the second controller is located in since the data bus segment is in any case moved in this way to the awake state to be able to interchange data with the first controller.

The first data bus segment which is associated with the first controller can be woken, for example, by the first controller sending a corresponding message to a gateway controller of the first data bus segment. The gateway controller can evaluate the message and then wake up all controllers in the independent (first) data bus segment. The wake-up device can therefore have at least one gateway controller by means of which the first data bus segment can communicate with further data bus segments of the data bus system and which is designed to wake further (for example all) controllers of the first data bus segment in response to a wake signal, which is received by the first controller, when a communication requirement is determined within the first data bus segment.

In an alternative refinement, waking can be performed automatically when, on the basis of a wake event, an arbitrary message is sent by means of the data bus, that is to say when there is any data communication ("wakeable CAN"). In some exemplary embodiments, the first controller, which has a communication requirement outside its independent data bus segment, can send an activation bit in the above-described message or in a separate message to the gateway controller of its data bus segment. The activation bit can be transmitted from the gateway controller to the other gateway controllers, which then wake the controllers of their respective data bus segments, in a suitable manner (for example in a status message which is transmitted in any case or in a separate notice) by means of the data bus 1. The at least one gateway controller can therefore be designed to directly or indirectly wake the second controller of the at least one second data bus segment in response to the wake signal (activation bit), which is received by the first controller, when a communication requirement is determined outside the first data bus segment.

In addition or as an alternative, individual, several or all data bus segments of the data bus system can be woken up in a manner prompted by the controller 6 of the diagnosis CAN for diagnosis purposes. To this end, a diagnosis command can be sent by means of the data bus 1, the diagnosis command containing, as information, at least an identifier or an identification of the data bus segment which is to be woken up. The data bus segment which is woken in this way can be activated for a limited time or else permanently. If several or all data bus segments are woken, several identifiers or a corresponding combination identifier can also be sent.

Provision is made for the two-stage wake process to be triggered by an event, that is to say the device for determining the communication requirement can be designed to determine the communication requirement of the first controller on the basis of a predefined operating state and/or of a change in the operating state of the motor vehicle. For example, a driver of the motor vehicle can operate a switch of an electrical parking brake. A brake controller which is associated with the parking brake can then send a wake message to its gateway controller and at the same time set the activation bit, so that all other data bus segments are likewise woken. As soon as the following wake process is concluded, the brake controller, which is set up in the chassis CAN for example, can interchange data with a controller of a display apparatus, which controller is located in the convenience CAN. The symbol for the activated parking brake can now be displayed in the display apparatus. A large number of further scenarios are likewise feasible.

With further advantage, the wake process can be triggered in a periodic manner. This can take place periodically with respect to time, but also depending on non-time-related recurring events. For example, in an electric vehicle which is charged by an external power source, it may be desirable for the state of charge of the battery to be transmitted to an external device, for example every 10 charging percentage points. To this end, the charge management system, which can be located in the drive CAN for example, can prompt a wake operation for all other data bus segments (for example chassis CAN, convenience CAN, infotainment CAN) in a periodic manner (at 10%, 20%, 30% etc. of the charging capacity). After conclusion of the wake process, information about the state of charge can be transmitted to a transmission unit which is located in the convenience CAN and which then transmits the information, for example, by means of a wireless mobile radio link.

According to a further disclosed embodiment, a data bus segment can change from the active state to the idle state when there is no more data communication and/or when conditions which are defined for the idle state in each controller of the data bus segment are satisfied. The apparatus, for example a motor vehicle controller, can therefore further comprise a device for switching data bus segments which are in the awake state back to the idle state to not waste any unnecessary electrical energy. In this case, the switching device can be designed, for example, to move the first and/or the at least one second data bus segment in each case back to the idle state after a predefined period of time after wake-up.

In a further refinement, provision is made for the order in which the data bus segments may change from the awake state to the idle state to be subject to specific conditions. In particular, the change to the idle state can depend on a specific data bus segment already being in the idle state. The switching device can therefore be designed to switch a data bus segment to the idle state only under the condition that a specific other data bus segment has already been moved to its idle state in advance. In one exemplary embodiment, provision can be made for all CAN data bus segments to remain active until the chassis CAN changes to the idle state. If this is the case, it is ensured that the vehicle is stationary. The other CAN data bus segments, such as drive CAN, convenience CAN, infotainment CAN for example, can now likewise change to the idle state. Exemplary embodiments of this kind can increase, in particular, the security of the motor vehicle.

According to a further aspect, some exemplary embodiments provide a method for operating a data bus system of a motor vehicle, which data bus system has a plurality of data bus segments, wherein a plurality of the data bus segments are designed to change from an awake state to an idle state and vice versa. The method comprises a step of determining a communication requirement of a first controller which is associated with a first data bus segment in the idle state. The method further comprises a further step of waking up the first data bus segment from the idle state to the awake state when a communication requirement of the first controller is determined. If there is a communication requirement of the first controller with a second controller outside the first data bus segment, the method comprises additionally waking up all further data bus segments, which are in the idle state, of the data bus system outside the first data bus segment in one go.

In other words, the method comprises the steps of determining a communication requirement of a controller, waking the data bus segment of the controller, and only when there is a communication requirement with at least one controller outside the woken data bus segment: waking up all further data bus segments, which are in the idle state, of the data bus system.

According to a further disclosed embodiment, a computer program for carrying out the method is also provided when the computer program is run on a programmable hardware component, such as a motor vehicle controller (microcontroller, FPGA, etc.) for example.

Furthermore, a vehicle is provided, which vehicle is designed or adapted for implementing the method, that is to say therefore has, for example, an apparatus for operating a data bus system.

Exemplary embodiments allow, as required, two-stage waking of all data bus segments of a motor vehicle data bus system. If waking a first data bus segment is inadequate for a communication requirement of a controller which is located in the first data bus system, all data bus segments, which can be considered for communication, of the vehicle data bus system can be woken in a second step without complicated addressing and/or signaling mechanisms. After all data bus segments are woken and communication has taken place, all the data bus segments can be moved back to their idle state.

In the following description of the attached figures, which show only a few exemplary embodiments, the same reference symbols may denote components which are the same or comparable. Furthermore, joint reference symbols may be used for components and objects which occur repeatedly in an exemplary embodiment or in a drawing but are described for one or more features collectively. Components or objects which are described using the same or joint reference symbols may be embodied in the same way, but may also be embodied differently, in respect of single, several or all features, for example the dimensions thereof, unless the description explicitly or implicitly reveals otherwise.

Figure 2:
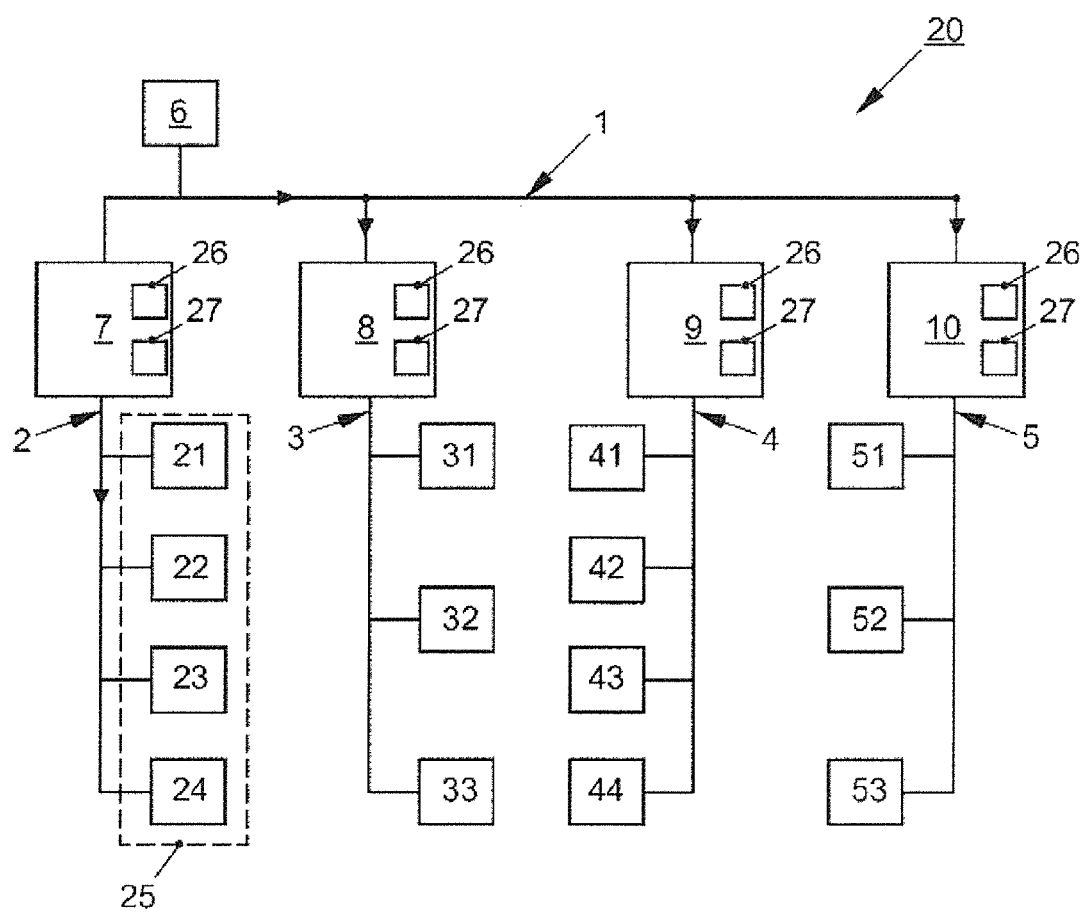
FIG. 2 shows a schematic illustration of an apparatus for operating a data bus system according to at least one disclosed embodiment.

FIG. 2 shows a schematic illustration of an apparatus 20 for operating a data bus system, which is already described with reference to FIG. 1, in a motor vehicle.

The data bus system has a plurality of separate or physically separated data bus segments 2, 3, 4, 5, wherein at least one and optionally all of the data bus segments 2, 3, 4, 5 are designed or adapted to change from an energetic awake state to an energetic idle state (energy-saving mode), and vice versa.

The apparatus 20 comprises a device 25 for determining a communication requirement, that is to say a requirement for data interchange, of a first controller 21, 22, 23 or 24 of a first data bus segment 2 which is initially in the idle state (that is to say one or more controllers 21, 22, 23, 24 of the first data bus segment 2 are in the energy-saving mode). In FIG. 2, the device 25 is associated, merely by way of example, with the data bus segment 2. It goes without saying that in exemplary embodiments, all data bus segments 2, 3, 4, 5 have a device 25 of this kind or can be coupled to a device of this kind.

Furthermore, the apparatus 20 comprises a device 26 for waking up the first data bus segment 2 from the idle state (energy-saving mode) to the awake state when a communication requirement of one of the controllers 21, 22, 23 or 24 is determined. The wake-up device 26 is designed to additionally wake up all further data bus segments 3, 4, 5, which are in the idle state, of the data bus system outside the first data bus segment 2 when a communication requirement of one of the controllers 21, 22, 23 or 24 with a second controller outside the first data bus segment 2 is determined. It also goes without saying here that, in exemplary embodiments, all data bus segments 2, 3, 4, 5 have a device 26 of this kind or can be coupled to a device of this kind.

The device 25 for determining the communication requirement can be, for example, a controller, which is specially designed for this purpose, of the first data bus segment 2. Each of the individual controllers 21, 22, 23, 24 of the first data bus segment 2 can likewise have a device of this kind, for example on the basis of an output sensor signal, to determine the communication requirement of a controller which corresponds to the sensor. In this case, the sensor signal can indicate a predefined operating state and/or a change in operating state of the motor vehicle, the intention being for a second controller of the first data bus segment 2 or a second controller, which is outside the first data bus segment 2, in one of the further data bus segments 3, 4, 5 to be informed of the operating state and/or change in operating state.

In the case of a purely two-stage wake method, the wake-up device 26 is, according to exemplary embodiments, designed to initially wake up all controllers 21, 22, 23, 24 of the first data bus segment 2, for example in response to a wake signal which is initiated by the first controller (in the first data bus segment 2) or a sensor which is coupled to the first controller, when a communication requirement is determined. If the communication partner of the first controller, which exhibits the communication requirement and is within the first data bus segment 2, is likewise within the first data bus segment 2, data communication is already possible after the first wake stage. After information is interchanged, the first data bus segment 2 can then be moved back to the energy-saving mode, for which purpose the apparatus can have a device 27 for switching data bus segments in the awake state back to the idle state. To this end, it is possible, for example, for a supply of current and/or voltage to the respective controller to be limited.

If, however, the communication partner of the first controller, which exhibits the communication requirement and merely by way of example is within the first data bus segment 2 here, is outside the first data bus segment 2 in one of the further data bus segments 3, 4, 5, exemplary embodiments make provision for all further data bus segments 3, 4, 5 of the bus system or the controllers located in the data bus segments to be moved from the idle state to the awake state in a second step of the wake method. In other words, starting from the first data bus segment 2, it is possible to wake all other data bus segments 3, 4, 5 in one go in the second step, irrespective of which of the further data bus segments 3, 4, 5 the desired communication partner of the first controller is actually situated in. To this end, the wake-up device 26 can be located, for example, in the gateway controller 7 of the first data bus segment 2, by means of which gateway controller the first data bus segment 2 communicates with the further data bus segments 3, 4, 5 of the data bus system and which gateway controller is designed to additionally wake up all further data bus segments 3, 4, 5, which are in the idle state, of the data bus system in one go when a communication requirement outside the first data bus segment 2 is determined, so that all data bus segments of the data bus system are in the awake state.

According to some exemplary embodiments, the data bus segments 2, 3, 4, 5 can be, for example, a chassis CAN 2, a drive CAN 3, a convenience CAN 4 and an infotainment CAN 5 (including multifunctional steering wheel LIN). As has already been described, the data bus segment which has the controller 6 may be, for example, a diagnosis CAN. When a communication requirement of the diagnosis data bus segment or a diagnosis controller 6 which is located in the diagnosis data bus segment with at least one second data bus segments 2, 3, 4, 5 is determined, only that second data bus segment which identifies the second data bus segment to be woken up can be woken up on the basis of a wake signal starting from the diagnosis data bus segment according to exemplary embodiments. Therefore, if the data bus segment which triggers the wake signal is a diagnosis data bus segment, individual further data bus segments 2, 3, 4, 5 of the data bus system can also be woken up with the wake signal according to exemplary embodiments. If, in contrast, the first data bus segment which wakes up the at least one further data bus segment is one of the data bus segments 2, 3, 4, 5, all further data bus segments (apart from the diagnosis data bus segment) are woken up when there is a communication requirement outside the first data bus system to be woken up. In general, the data bus segments can be woken up by means of one or more gateways 7, 8, 9, 10 which correspond to the data bus segments involved.

Figure 3:
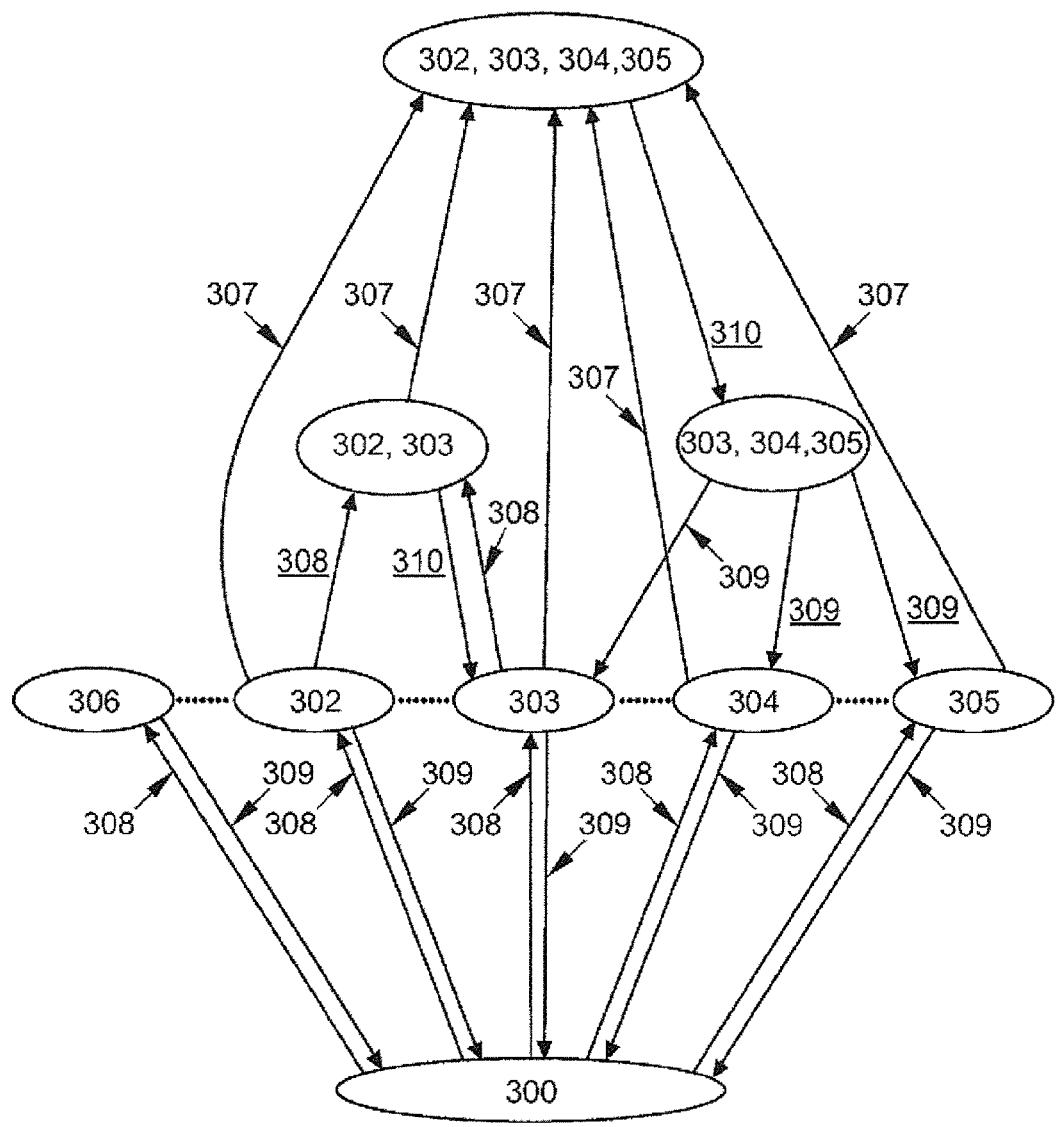
FIG. 3 shows a state diagram for a data bus system according to at least one disclosed embodiment.

A selection of possible system states of a vehicle which implements the wake concept according to the disclosed embodiments is illustrated in FIG. 3. In this case, exemplary embodiments can be used, for example, when an ignition (terminal 15) of the vehicle is in the "off" position, that is to say the vehicle has been turned off or parked for example.

In FIG. 3, reference symbols 302, 303, 304 and 305 respectively denote those (operating) states in which the associated data bus segments 2, 3, 4 and 5 are respectively individually awake or active. The state which is denoted by the reference symbol sequence "302, 303, 304, 305" is assumed when all data bus segments 2, 3, 4, 5 (for example chassis CAN, a drive CAN, a convenience CAN and an infotainment CAN), which are illustrated in FIG. 1 or 2, are awake/active at the same time. According to one exemplary embodiment, change 310 (for example "chassis CAN sleep") from this state "302, 303, 304, 305" is possible only to the state "303, 304, 305" since the switching device 27 can be designed to switch a data bus segment 3, 4, 5 to the idle state only under the condition that another data bus segment 2 (for example chassis CAN) which is necessary for this purpose has already been moved to its idle state in advance. Therefore, the fact that the data bus segment 2 has changed to the idle state corresponds to the transition 310. The data bus segment 2 may be, for example, the above-mentioned chassis CAN. From the state "303, 304, 305", that is to say the data bus segments 3, 4 and 5 are all active at the same time, the data bus segments 3, 4, 5 which are still active can change automatically and independently of one another to the idle state when all of the conditions which are necessary for this purpose are present (for example time lapse, predetermined operating state, etc.), this being illustrated in FIG. 3 by transitions 309 to the states 303, 304 and 305 and then to the state 300 (all data bus segments in the energy-saving mode). In the state 300, all data bus segments 2, 3, 4, 5 (and the data bus segment with the controller 6) are each in the idle state. Each individual data bus segment 2, 3, 4, 5 (and the data bus segment with the controller 6) can be individually woken from this state by a condition (wake event) which is necessary for this purpose occurring. The condition may be an event of the kind which has already been described, that is to say, for example, operation of a switch or a specific operating state of the vehicle. The device 25 for determining the communication requirement can therefore be designed to determine the communication requirement of a controller on the basis of a predefined operating state and/or of a change in the operating state of the motor vehicle.

Waking of the individual data bus segments 2, 3, 4, 5 is denoted by the transition 308 with which a change can be made from the state 300 to each of the states 302, 303, 304, 305, 306. If there is now a communication requirement between controllers of different data bus segments, exemplary embodiments can be used to wake up the entire data bus system, that is to say move the data bus system to the state "302, 303, 304, 305", at the same time starting from the states 302, 303, 304, 305. To this end, the above-described activation bit can be set and evaluated by the respective gateway controllers 7, 8, 9, 10 for example. The state transition which is triggered as a result is identified by reference symbol 307.

FIG. 3 further illustrates the state "302, 303". This state is assumed in the present example when the data bus segments 2 and 3 (which can correspond, for example, to the drive CAN and to the chassis CAN) are activated independently of one another (transitions 308). This can occur entirely at random, but it is likewise feasible for a specific operating state of the vehicle to have triggered wake-up of the two data bus segments. Since, according to some exemplary embodiments, the drive CAN 3 may change to the idle state only after the chassis CAN 2 as already mentioned, the transition 310 from the state "302, 303" to the state 303 can initially take place (drive CAN 3 still active, chassis CAN 2 already in the idle state), and then the transition 309 to the state 300.

Figure 4:
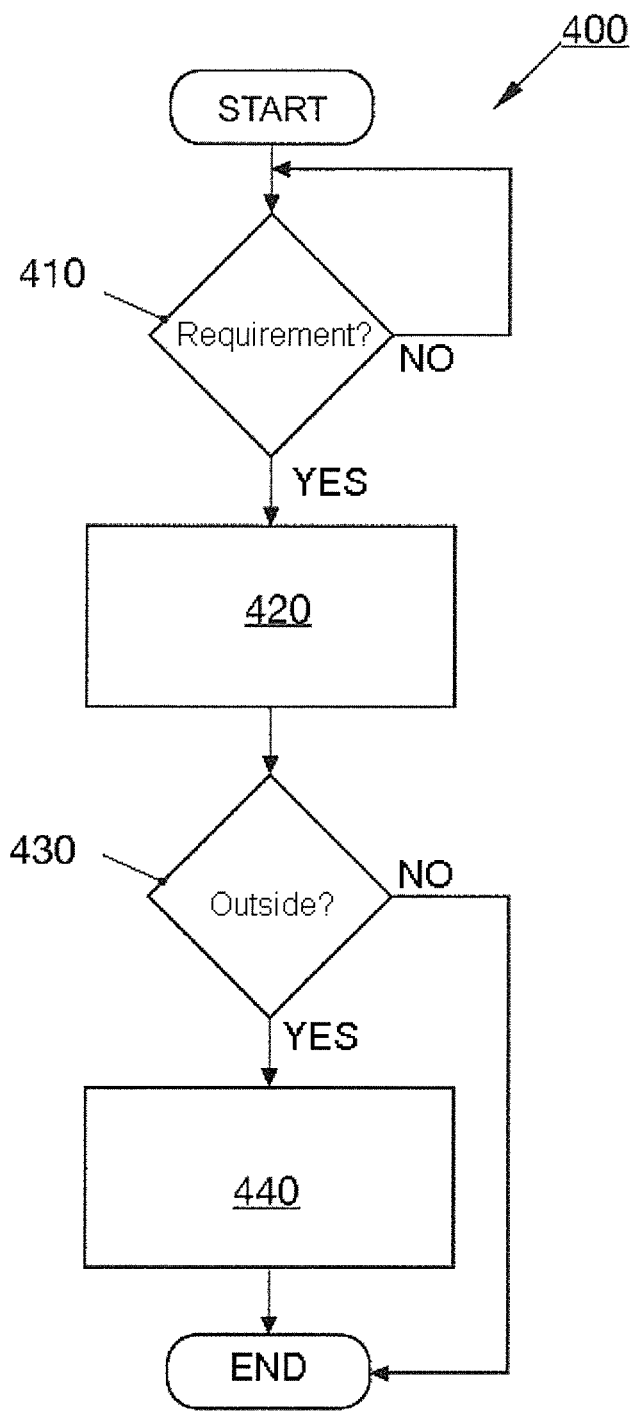
FIG. 4 shows a flowchart for a method for operating a data bus system according to at least one disclosed embodiment.

FIG. 4 schematically shows a method 400 for operating a data bus system of a motor vehicle according to one exemplary embodiment.

The method comprises a step 410 of determining a communication requirement of a first controller of a first data bus segment which is in the idle state. In a further step 420, the entire first data bus segment is moved from the idle state to the awake state when a communication requirement of the first controller is determined. In a third step 430, it is determined whether there is a communication requirement of the woken-up data bus segment with a second data bus segment outside the first data bus segment. If no, the method 400 can be terminated and the first data bus segment can be moved back to the idle state after communication has taken place within the first data bus segment. However, when a communication requirement of the first controller with a second controller outside the first data bus segment is determined, all further data bus segments, which are in the idle state, of the data bus system outside the first data bus segment are additionally woken up in a further step 440. That is to say, in step 440, all data bus segments of the bus system are woken up in one go at the same time to then allow the required data communication to take place.

In summary, exemplary embodiments propose initially only locally waking network elements or data bus segments when there is a communication requirement and waking the entire vehicle or the entire data bus system only when there is a communication requirement outside the independent network element. To this end, active functions can wake the local or the entire vehicle network for a short period of time in a periodic or event-based manner. Waking of a vehicle CAN activates, for example initially, only the local vehicle CAN network. A controller can activate all other wakeable network elements by means of a wake mechanism which extends across buses (for example setting a wake-up bit) only in the case of a few specific events. Controllers with a gateway function can evaluate the activation bit and wake the other (physically separated) networks.

The CAN networks 2, 3, 4, 5 can be locally activated for a limited time or permanently by setting a diagnosis command by means of a diagnosis CAN with the controller 6. Active functions can wake the local or the entire vehicle network for a short period of time in a periodic or event-based manner. In the case of functions with a temporary communication requirement, a wake-up bit can be set in a periodic or event-based manner to activate, starting from the diagnosis CAN, a local network 2, 3, 4, 5 or the entire vehicle network for a short time in a targeted manner. During this time, the data which is required for the function can be interchanged. After data interchange, CAN segments which are not required can be deactivated again.

A Media Oriented Systems Transport (MOST) data bus segment or sub-bus can be activated and deactivated in each system state in some exemplary embodiments. In the case of a state "terminal 15 on" (ignition on), a sleeping MOST can be activated by means of a wake-up signal of a gateway controller, for example when the diagnosis means or the component protection means require the MOST.

The features disclosed in the above description, the following claims and the attached figures may be significant and may be implemented in their various embodiments either individually or in any desired combination to realize an exemplary embodiment.

Although some aspects have been described in connection with an apparatus, it goes without saying that these aspects are also a description of the corresponding method, which means that a block or an element of an apparatus is also intended to be understood to mean a corresponding method step or to mean a feature of a method step. Similarly, aspects which have been described in connection with or as a method step are also a description of a corresponding block or detail or feature of a corresponding apparatus.

Depending on the specific implementation requirements, it is possible for exemplary embodiments to be implemented in hardware or in software. The implementation can be performed using a digital storage medium, for example a floppy disk, a DVD, a Blu-Ray disk, a CD, a ROM, a PROM, an EPROM, an EEPROM or a FLASH memory, a hard disk or another magnetic or optical storage means which stores electronically readable control signals which can interact, or do interact, with a programmable hardware component in such a way that the respective method is carried out.

A programmable hardware component may be formed by a processor, a computer processor (CPU=central processing unit), a graphics processor (GPU=graphics processing unit), a computer, a computer system, an application-specific integrated circuit (ASIC), an integrated circuit (IC), a single-chip system (SOC=system on chip), a programmable logic element or a field-programmable gate array (FPGA) with a microprocessor.

The digital storage medium may therefore be machine-readable or computer-readable. Some exemplary embodiments therefore comprise a data storage medium which has electronically readable control signals which are able to interact with a programmable computer system or a programmable hardware component in such a way that one of the methods described in this document is carried out. An exemplary embodiment is therefore a data storage medium (or a digital storage medium or a computer-readable medium) on which the program for carrying out one of the methods described in this document is recorded.

In general, exemplary embodiments may be implemented as a program, firmware, computer program or computer program product with a program code or as data, wherein the program code or the data is effective for carrying out one of the methods when the program is run on a processor or a programmable hardware component. The program code or the data may also be stored, for example, on a machine-readable storage medium or data storage medium. The program code or the data may be present as source code, machine code or byte code and also as other intermediate code, amongst others.

Furthermore, a further exemplary embodiment is a data stream, a signal train or a sequence of signals which is or are the program for carrying out one of the methods described in this document. The data stream, the signal train or the sequence of signals may be configured, for example, to be transferred via a data communication link, for example via the internet or another network. Exemplary embodiments are therefore also signal trains which represent data and which are suitable for transmission via a network or a data communication link, wherein the data is the program.

A program according to an exemplary embodiment may implement one of the methods when it is carried out, for example, by reading memory locations or writing a data item or multiple data to the memory locations, this resulting in switching processes or other processes in transistor structures, in amplifier structures, or in other electrical, optical or magnetic assemblies or assemblies operating on the basis of a different operating principle, if need be. Accordingly, by reading a memory location, it is possible to capture, determine or measure data, values, sensor values or other information from a program. A program can therefore capture, determine or measure magnitudes, values, measurement variables and other information by reading one or more memory locations, and can cause, prompt or carry out an action and also actuate other devices, machines and components by writing to one or more memory locations.

The exemplary embodiments described above are merely an illustration of the principles of the present invention. It goes without saying that modifications to and variations in the arrangements and details described in this document will be apparent to other persons skilled in the art. It is, therefore, intended that the invention be limited only by the scope of protection of the patent claims below and not by the specific details which have been presented using the description and the explanation of the exemplary embodiments in this document.

Modern motor vehicles, such as passenger cars or heavy goods vehicles for example, typically have a large number of electrical and electronic controllers both to read out and to control sensors and actuators. Controllers of this kind, of which the number is continually increasing, are usually interlinked by means of a data bus system, in particular a field bus system which can have a plurality of data bus system elements or data bus segments. In the present case, a data bus system is intended to be understood to mean a system for transmitting data between a plurality of controllers via a common transmission path, in which system the controllers (subscribers) are not involved in data transmission between other subscribers. Data bus systems of this kind are known, for example, from DE 10 2009 029 541 A1, EP 0870 648 A2, DE 10 2006 0040 442 A1, WO 00/30898 A1, DE 199 47 407 A1, EP 2 151 737 A1, US 2011/0046844 A1, DE 10 2006 023 274 A1, DE 102 10 664 C1, DE 10 2006 040 442 A1 or EP 2 408 141 A1.

A data bus system for motor vehicles of this kind, which is known from the prior art, is illustrated, by way of example, in FIG. 1.

Controllers (without reference symbols) which perform different functions in the vehicle are in each case connected to different data bus segments 2, 3, 4, 5 which are separate from one another. In this case, each data bus segment 2, 3, 4, 5 constitutes an inherently closed data bus. Data interchange between the different data bus segments 2, 3, 4, 5 typically takes place by means of so-called gateway controllers 7, 8, 9, 10 which are connected to one another by a data bus 1. Instead of this exemplary embodiment, it is likewise feasible to connect the individual data bus segments 2, 3, 4, 5 to a central gateway controller which would then combine the functions of the gateway controllers 7, 8, 9, 10 and also of the data bus 1. In automobile technology, gateways are often found between different data buses, such as Controller Area Network (CAN) in different speed versions, Media Oriented Systems Transport (MOST) bus etc. for example. A typical configuration in a vehicle comprises a "fast" CAN bus segment for engine control and similar real-time controllers and a "slow" CAN bus segment for controllers containing little data and data which occurs only seldom (for example "convenience bus", for example for tire pressure monitoring or tank sensor). For certain purposes (diagnosis), some data also has to be provided on the respectively other bus. To this end, the gateway can copy the data from one bus to the other. The gateway can occur as an independent controller or be part of an existing, larger controller.

Furthermore, a controller 6 which serves for diagnosis purposes is connected to the data bus 1. The controller 6 can have a connection, not illustrated, for an external diagnosis unit. The controller can further serve as a gateway controller for a further data bus segment (likewise not illustrated).

The illustrated data bus system may be, for example, a CAN data bus system. Modern motor vehicles are equipped with a plurality of separate CAN bus segments which combine different functional groups. Therefore, the illustrated data bus segments 2, 3, 4, 5 can correspond, for example, to a drive CAN, a chassis CAN, a convenience CAN and an infotainment CAN which are coupled to one another by means of one or more gateways. The controller 6 can correspond, for example, to a diagnosis CAN gateway. However, individual data bus segments or all data bus segments 2, 3, 4, 5 can likewise be realized with other serial data bus technologies, for example FlexRay, MOST or Local Interconnect Network (LIN). The data bus 1 which connects the gateways 7, 8, 9, 10 of the individual data bus segments can also be realized by means of different technologies.

The large number of controllers in a modern motor vehicle generates a high level of current consumption. Modern controllers are therefore equipped with the possibility of changing to a power-saving idle or sleep state when inactive. When the controllers are required, they can be woken from the idle state. This is necessary, for example, when there is a communication requirement, that is to say when two or more controllers wish to interchange data.

The prior art (for example DE 601 26 373 T2) discloses solutions in which all data bus segments and therefore all controllers are woken when there is a communication requirement. However, this solution has an unnecessarily high level of energy consumption since data communication should generally take place only between a few controllers and the majority of the controllers are therefore unnecessarily woken. A further disadvantage is the high level of loading on the controllers when they are unnecessarily kept ready for operation for a very long time. This may be the case, for example, in electric vehicles when all controllers are active not only in drive mode but also during an overall charging process.

A further possibility is to assign controllers to so-called network elements or clusters. However, in this case, the network elements are usually not identical to the above-described data bus segments, but rather constitute logical groups which can also contain controllers comprising different data bus segments. If there is a communication requirement in a controller, all controllers of the associated network element are woken. This solution has the disadvantage that it is very costly to implement. In particular, in the event of a change in the data bus system, for example in the event of subsequent installation or replacement of a controller, it is necessary to ensure, at high cost, that the network elements are further correctly and comprehensively defined.

The invention claimed is:

1. An apparatus for operating a data bus system of a motor vehicle, wherein the data bus system has a plurality of data bus segments that change from an awake state to an idle state and vice versa, the apparatus comprising:
- a device that determines a communication requirement of a first controller of a first data bus segment in the idle state;
- a wake-up device that wakes up the first data bus segment from the idle state to the awake state in response to a determination of a communication requirement of the first controller, and
- a device for switching data bus segments which are in the awake state back to the idle state,
- wherein the wake-up device also simultaneously wakes up all further data bus segments of the plurality of data bus segments in the idle state other than the first data bus segment in response to determination of a communication requirement of the first controller with a second controller outside the first data bus segment, so that all of the plurality of data bus segments of the data bus system are in the awake state, and
- wherein the device for switching to the idle state switches a data bus segment to the idle state only when a specific other data bus segment has already been moved to the idle state in advance.

2. The apparatus of claim 1, wherein the wake-up device wakes all controllers, which are in the idle state, of the first data bus segment in response to a wake signal, which is initiated by the first controller when a communication requirement is determined within the first data bus segment.

3. The apparatus of claim 1, wherein the first data bus segment is a diagnosis bus segment, and wherein the wake-up device also wakes up a second data bus segment on the basis of a diagnosis signal, which identifies the second data bus segment, in response to determination of a communication requirement of the diagnosis bus segment with the at least one second data bus segment.

4. The apparatus of claim 1, wherein the wake-up device has at least one gateway controller by which the first data bus segment communicates with further data bus segments of the data bus system and which wakes further controllers of the first data bus segment in response to a wake signal, which is received by the first controller, when a communication requirement is determined within the first data bus segment.

5. The apparatus of claim 4, wherein the at least one gateway controller directly or indirectly wakes the second controller of the at least one second data bus segment in response to the wake signal, which is received by the first controller, when a communication requirement is determined outside the first data bus segment.

6. The apparatus of claim 1, wherein the device for determining the communication requirement is designed to determine the communication requirement of the first controller based on a predefined operating state and/or of a change in the operating state of the motor vehicle.

7. The apparatus of claim 1, wherein the device for switching to the idle state moves the first and/or the at least one second data bus segment back to the idle state after a predefined period of time after wake-up.

8. The apparatus of claim 1, wherein the other data bus segment is a chassis data bus segment.

9. The apparatus of claim 1, wherein, in the idle state of a data bus segment, at least one controller of the data bus segment is in an idle state with electrical power consumption, which is reduced in comparison to an awake state.

10. The apparatus of claim 1, wherein the data bus system has a field bus system from the group comprising CAN bus, FlexRay bus, MOST bus and/or LIN bus.

11. A method for operating a data bus system of a motor vehicle, wherein the data bus system has a plurality of data bus segments, wherein a plurality of the data bus segments are designed to change from an awake state to an idle state and vice versa, the method comprising:
- determining a communication requirement of a first controller of a first data bus segment in the idle state;
- waking up the first data bus segment from the idle state to the awake state in response to determination of a communication requirement of the first controller;
- simultaneously waking up all further data bus segments, of the data bus system outside the first data bus segment that are in the idle state in response to a determination of a communication requirement of the first controller with a second controller outside the first data bus segment, so that all data bus segments of the data bus system are in the awake state;
- switching data bus segments which are in the awake state back to the idle state, wherein the switching to the idle state switches a data bus segment to the idle state only when a specific other data bus segment has already been moved to the idle state in advance.

12. A computer program product stored on a non-transitory machine-readable storage medium that when executed performs the method of claim 11.

* * * * *